(12) United States Patent
Park et al.

(10) Patent No.: US 7,537,715 B2
(45) Date of Patent: *May 26, 2009

(54) SELF-POLED ELECTRO-OPTIC AND NONLINEAR OPTICAL POLYMER, METHOD OF MANUFACTURING THE POLYMER, AND FILM MANUFACTURED FROM THE POLYMER

(75) Inventors: Seung Koo Park, Daejeon (KR); Jung Jin Ju, Daejeon (KR); Suntak Park, Daejeon (KR); Min-su Kim, Daejeon (KR); Myung-Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 516 days.

This patent is subject to a terminal disclaimer.

(21) Appl. No.: 11/250,269

(22) Filed: Oct. 14, 2005

(65) Prior Publication Data

US 2006/0131548 A1    Jun. 22, 2006

(30) Foreign Application Priority Data

Oct. 15, 2004    (KR) .................. 10-2004-0082468

(51) Int. Cl.
F21V 9/00 (2006.01)
G02B 5/02 (2006.01)
G02C 7/10 (2006.01)
G02F 1/361 (2006.01)
G03B 11/00 (2006.01)

(52) U.S. Cl. ............ 252/582; 523/353; 528/288; 528/353; 528/358; 528/358.3; 528/486

(58) Field of Classification Search ........... 252/582; 428/413, 1.31, 333; 522/100; 528/310
See application file for complete search history.

(56) References Cited

U.S. PATENT DOCUMENTS

| | | | |
|---|---|---|---|
| 5,225,285 A | 7/1993 | Hall et al. | |
| 5,247,055 A | 9/1993 | Stenger-Smith et al. | |
| 5,399,664 A * | 3/1995 | Peng et al. | 528/353 |
| 5,420,172 A | 5/1995 | Nordmann et al. | |
| 5,520,968 A | 5/1996 | Wynne et al. | |
| 5,688,906 A * | 11/1997 | Jen et al. | 528/353 |
| 5,736,592 A * | 4/1998 | DeMeuse et al. | 523/137 |
| 5,776,374 A | 7/1998 | Newsham et al. | |
| 5,952,448 A * | 9/1999 | Lee et al. | 528/170 |
| 6,114,031 A | 9/2000 | Roberts et al. | |
| 6,828,409 B2 * | 12/2004 | Park et al. | 528/170 |
| 7,135,543 B2 * | 11/2006 | Park et al. | 528/353 |

FOREIGN PATENT DOCUMENTS

JP    2006-053204 A    *    2/2006
KR    10-2004-0094191        11/2004

OTHER PUBLICATIONS

Seung Koo Park, Jung Yun Do, Jung-Jin Ju, Suntak Park, and Myung-Hyun Lee, New Host-Guest Polymeric System for Thermal Stability Enhancement of Electro Optic Effect, Mat. Res. Soc. Symp. Proc. vol. 725 © 2002 Materials Research Society p. 9.25.1-p. 9.25.6.*
Park et al.; "New Host-Guest Polymeric System For Thermal Stability Enhancement Of Electro Optic Effect"; Materials Research Society; 2002; pp. 1-6.*
K. Kim, et al.; "Thermal imidization behavior of aromatic poly (amic dialkyl ester) precursors derived from biphenyltetracarboxylic dianhydride"; Polymer Bulletin 34; 1995; pp. 219-226.*
Tian-An Chen, et al.; "Two-Step Synthesis of Side-Chain Aromatic Polyimides for Second-Order Nonlinear Optics"; Macromolecules 1996, 29; pp. 535-539.*
Dong, Yu, et al.; "Novel Aromatic Polyimides for Nonlinear Optics"; J. Am. chem. Soc. 1995, 117; pp. 11680-11686.*
'Polymers for Second-Order Nonlinear Optics' Lindsay et al., ACS Symposium Series 60, American Chemical Society, Washington, DC 1995, pp. 1-19.
'Polymeric Electrooptic 2 x 2 Switch Consisting of Bifurcation Optical Active Waveguides and a Mach-Zehnder Interferometer' Lee et al., IEEE Journal on Selected Topics in Quantum Electronics, vol. 7, No. 5, Sep./Oct. 2001, pp. 812-818.
'Improved second-harmonic generation from Langmuir-Blodgett films of hemicyanine dyes' Ashwell et al., Nature, vol. 357, Jun. 4, 1992, pp. 393-395.
'Supramolecular Approaches to Second-Order Nonlinear Optical Materials. Self-Assembly and Microstructural Characterization of Intrinsically Acentric [(Aminophenyl)azo]pyridinium Superlattices'Lin et al., J. Am. Chem. Soc., vol. 118, No. 34, 1996, pp. 8034-8042.

* cited by examiner

Primary Examiner—Ling-Siu Choi
Assistant Examiner—Bijan Ahvazi
(74) Attorney, Agent, or Firm—Ladas & Parry LLP

(57) ABSTRACT

A polyamic ester (PAE) film, which shows an electro-optic (EO) and nonlinear optical (NLO) properties without a poling process, is prepared. The chromophore in the film seems to be slightly oriented normally to the film surface (transverse magnetic field (TM) direction even though the polymer solution is spin-coated. This is due to the nano-configuration structure of PAE controlled by introducing a designed chemical structure into the monomeric repeating unit of PAE. Manufacturing the relating devices can be simplified by using the self-poled polymer film as a polymer waveguide. Additionally, the EO property of the film is thermodynamically stable.

10 Claims, 6 Drawing Sheets

FORMULA 11 - MOPAC
most stable calculated molecular structure

FORMULA 11 (Chemical Formula)

SELF-POLED ELECTRO-OPTIC AND NONLINEAR OPTICAL POLYMER, METHOD OF MANUFACTURING THE POLYMER, AND FILM MANUFACTURED FROM THE POLYMER

CROSS-REFERENCE TO RELATED APPLICATION

This application claims priority to the benefit of Korean Patent Application No. 2004-82468, filed Oct. 15, 2004, the disclosure of which is incorporated herein by reference in its entirety.

BACKGROUND

1. Field of the Invention

The present invention relates to a self-poled electro-optic (EO) and nonlinear optical (NLO) polymer, a method of manufacturing the polymer, and a film manufactured from the polymer. More specifically, the present invention relates to a self-poled EO and NLO polymer, a method of manufacturing the polymer, and a film manufactured from the polymer. Organic chromophores chemically attached to the polymer are one-directionally oriented in 3-dimensional space due to the configuration control of the polymer backbone chemical structure. A poling process is not required when the film is formed.

2. Discussion of Related Art

Recently, in line with the ongoing development of devices for high-speed and high-bandwidth data transmission, EO and NLO materials that can be used in the field are in high demand, and researches on their utilization have actively been in progress. Materials currently used for high-speed optical communication devices include inorganic crystals such as $LiNbO_3$ and InGaAsP. The cost for manufacturing such materials is very high even if they show stable optical nonlinearity. The manufacturing process is also difficult and time-consuming.

On the other hand, organic materials, polymers in particular, with EO and NLO properties have been developed for about 20 years. Compared with the aforementioned inorganic materials, they are easy to be synthesized and processed. In addition, their optical properties such as refractive index, optical coefficient, and absorption wavelength can be controlled as needed. An organic polymer material having EO and NLO properties is manufactured by chemically introduction of organic chromophores into a polymer backbone. Organic chromophores have conjugation on which electrons can move. It shows a dipole moment by introducing an electron-donating and electron-releasing group to the molecule, and is poled with applied electric field. Introducing the organic chromophores into polymer gives the polymer system electro-optic and nonlinear optical properties.

EO and NLO polymers can be largely classified into four groups according to the relationship between the polymer and the organic chromophore (G. A. Lindsay, "Second-Order Nonlinear Optical Polymers: An Overview", ACS Symp. Ser. 60, G. A. Lindsay and K. D. Singer eds., ACS, 1995, Chapter 1).

The first group is host-guest type polymers. These polymers are prepared by dispersing an organic chromophore into a polymer matrix. Its preparation is simple. Once the organic chromophore is well diffused into the polymer matrix, the poling effect can be maximized due to free motion of the organic chromophore molecules in the polymer. However, the optical nonlinearity significantly decrease due to the free motion of molecules at high temperatures during an optical device is manufactured. In addition, the glass transition temperature (Tg) of the polymer decreases with increasing the content of the organic chromophores. Optical loss originates from the organic chromophore domains, resulting in optical loss.

The second group is side chain-type polymers. This type of polymer is developed to overcome the problem of the host-guest polymer by chemically attaching the organic chromophore to a polymer main chain. Further, separation between the organic chromophore and polymer matrix is prevented and a proper Tg of the polymer is obtained to achieve high temperature stability of the optical nonlinearity. The Tg of the EO polymer obtained using this method is preferably in the range of 150° C. to 200° C. Poling efficiency is maximized around Tg where molecular motion in the EO polymer is high. The optical nonlinearity obtained at below 150° C. may decay during a device is processed (The processing temperature is between about 80° C. and 100° C.). The organic chromophore can be decomposed during poling above 200° C. (M. H. Lee et al., "Polymeric Electrooptic 2×2 Switch Consisting of Bifuraction Optical Active Waveguides and a Mach-Zehnder Interferometer", IEEE J. on Selected Topics in Quantum Electronics, 7, 812, 2001).

The third group is main chain-type polymers, obtained by incorporation of a nonlinear optical organic chromophore into a polymer main chain. As anticipated, molecular mobility of this type polymer system decreases compared with the side-chain type polymer system so that the EO effect is highly thermostable.

The fourth group is crosslinked type polymers. This type polymer system is used to improve the thermal stability of EO and NLO effect after poling the host-guest and side-chain type polymers with low Tg. In this method, the polymer main and side chains are crosslinked during or after poling the EO and NLO polymer. After the EO polymer is crosslinked, the molecular motion of the organic chromophore is reduced so that the EO effect can be significantly maintained even at high temperature. In general, the polymer main chain is thermo- or photo-crosslinked in the presence of a catalyst. However, after the crosslinking reaction, the unreacted cross-linkers or catalyst remain, which limits use of the crosslinked polymer system for optical devices (U.S. Pat. No. 5,420,172, U.S. Pat. No. 5,776,374).

Among the above four types polymer system, it is well known that the side chain type polymer system is the most suitable for optical devices in terms of poling effect and thermal stability of the optical nonlinearity.

Korean Patent Application No. 2003-28187 entitled "Side Chain Type Polyamide Ester as Electro-Optic and Nonlinear Optical Polymer, Manufacturing Method Thereof, and Film Manufactured Therefrom" filed May 2, 2003, by the present inventors, discloses EO or NLO side chain polymer manufactured by reaction of an organic chromophore with polyamic acid, which is a precursor of polyimide.

Further, all EO and NLO polymers obtained from any of the above four methods are necessarily applied with an external electric field while the polymers is heated to around their Tg, to obtain high EO and NLO polymer property. The organic chromophores in the film are noncentrosymmetric. In fact, in manufacturing a polymer optical device such as an optical modulator or an optical switch, an EO and NLO polymer film is between a lower cladding layer and an upper cladding layer, and an electrode is deposited on the upper cladding layer to apply an electric field in a direction of a film thickness for poling the polymer waveguide. An external electric field is applied according to the thickness of the cladding and core layers. Therefore, the poling effect is especially affected by electric conductivity between the cladding and the polymer core. In order to maximize the poling effect, it is important to develop the cladding layer having lower conductivity than that of the electro-optic and nonlinear optical polymer. That is another research subject.

If the organic chromophores in the polymer film spontaneously is aligned themselves noncentrosymmetrically without a poling process when EO and NLO polymer is spin-coated, all processes related to the poling process during manufacture of the optical device can be omitted so that the overall process is simplified and requirements for cladding materials are simplified. In general, such a natural noncentrosymmetric EO and NLO polymer film is obtained using a langmuir-blodgett (LB) process or a layer-by-layer self-assembly process (Webin Lin et al, Supramolecular approaches to Second-Order Nonlinear Optical Materials, Self-Assembly and Microstructural Characterization of Intrinsically Acentric [(aminophenyl)azo]pyridinum Superlattices, J. Am. Chem. Soc., 118, 8034, 1996), in which single molecular layers are stacked layer-by-layer due to molecular force of the organic chromophores. However, it is not easy to obtain a polymer film with a thickness of 3 to 4 μm or more required in real optical devices.

The present inventors found that the EO and NLO side chain polyamide ester disclosed in Korean Patent Application No. 2003-28187 has three diacid-diester isomers in the polymer repeating unit, so that when the isomer with one-directionally oriented chromophore in 3-dimensional space is separated and used for polymerization, high EO and NLO properties can be naturally achieved without a poling process. This invention renders a poling process unnecessary and the EO film with a desired thickness is easily formed by a simple spin-coating method.

SUMMARY OF THE INVENTION

The present invention is directed to a self-poled EO and NLO polymer.

Further, the present invention is also directed to a method of manufacturing a self-poled EO and NLO polymer.

The present invention is also directed to a film manufactured from a self-poled EO and NLO polymer.

One aspect of the present invention provides self-poled EO and NLO polymer represented by the following Formula 1, wherein among three types of isomers in a diacid-diester monomer in which an organic chromophore is chemically attached to an aromatic dianhydride, the self-poled EO and NLO polymer is obtained by a polymerization reaction between a diacid-diester monomer containing largely isomer with one-directionally oriented chromophore in 3-dimensional space and a diamine:

[Formula 1]

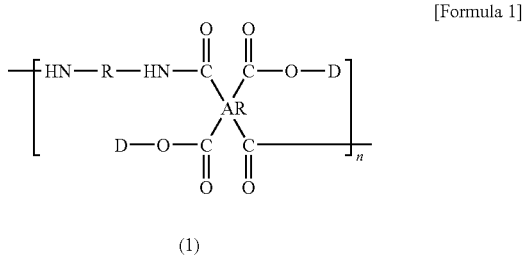

(1)

where, AR is an aromatic group, R is an aliphatic or aromatic group, D is a residue of an organic chromophore molecule having EO and NLO properties, and n is 5 to 500.

It is preparable that a mole ratio of the isomer with one-directionally oriented chromophore in 3-dimensional space in the EO polymer as shown in Formula 1 may be 0.45 to 1.

In addition, the organic chromophore may be one selected from a group consisting of 2-{ethyl-[4-(4-nitro-phenylazo)-phenyl]-amino}-ethanol (DR1), 2-{[4-(2-chloro-4-nitro-phenylazo)-phenyl]-ethyl-amino)-ethanol (DR13), 2-(methyl-{4-[2-(4-nitro-phenyl)-vinyl]-phenyl}-amino)-ethanol, and 2-cyano-3-{4-[2-(4-hydroxy-ethyl)-methyl-amino]-phenyl}-but-2-endinitrile.

An example of a polymer according to the present invention is illustrated in FIG. 3 as Formula 2 where n is 5 to 500.

Another aspect of the present invention provides a method of manufacturing self-poled EO and NLO polymer, including the steps of: reacting an aromatic dianhydride with an organic chromophore having optical nonlinearity to synthesize a diacid-diester monomer; separating only an isomer with one-directionally oriented chromophore in 3-dimensional space from the diacid-diester isomer mixture; and polymerizing the separated monomer and a diamine.

In the manufacturing method of the present invention, the dianhydride may be an aromatic one, the organic chromophore may be a π-conjugated organic molecule having both an electron-donating group and an electron-releasing group, the dianhydride and the organic chromophore may react in a mole ratio of 1:2.1 to 1:2.2, and the diacid-diester isomer with one-directionally oriented chromophore in 3-dimensional space may be separated through an extraction method.

The diacid-diester monomer and the diamine may be polymerized at a low temperature using a polymerization catalyst including phenylphosphonic dichloride and pyridine.

Still another aspect of the present invention provides a film manufactured from self-poled EO and NLO polymer, wherein among three types of isomers in a diacid-diester monomer in which an organic chromophore is chemically attached to an aromatic dianhydride, the self-poled EO and NLO polymer is prepared from a polymerization reaction between a diacid-diester monomer containing largely isomer with one-directionally oriented chromophore in 3-dimensional space and a diamine

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

Figure 1:
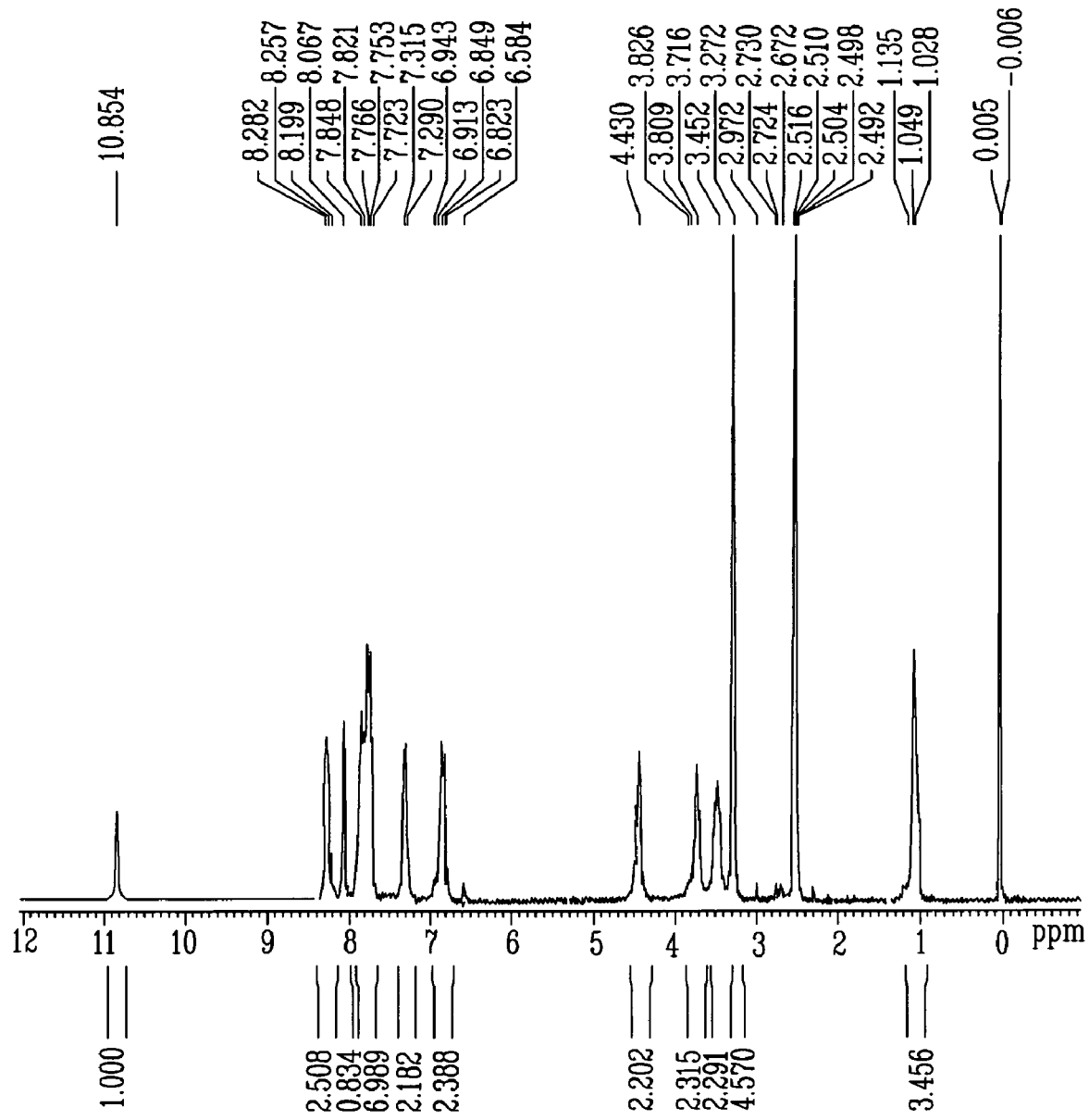
FIG. 1 shows a nuclear magnetic resonance spectrum (1H-NMR) of a polymer synthesized according to a first embodiment of the present invention.

Hereinafter, an exemplary embodiment of the present invention will be described in detail. However, the present invention is not limited to the embodiments disclosed below, but can be implemented in various types. Therefore, the present embodiment is provided for complete disclosure of the present invention to fully inform the scope of the present invention to those ordinarily skilled in the art. In the following description, same drawing reference numerals are used for the same elements even in different drawings, and explanations of the same elements are omitted.

According to a first aspect of the present invention, there is provided a self-poled EO and NLO polymer, wherein among three types of isomers in a diacid-diester monomer in which an organic chromophore is chemically attached to an aromatic dianhydride, the self-poled EO and NLO polymer is obtained by a polymerization reaction between the diacid-diester monomer containing largely isomer with one-directionally oriented chromophore in 3-dimensional space and a diamine. Here, the organic chromophore is chemically attached to a polymer main chain and naturally oriented in one direction through molecular design of the monomer when the polymer is synthesized, such that a poling effect can be obtained without an additional poling process.

When an aromatic group is in a main chain of the EO and NLO polymer, the configuration of the polymer main chain varies according to the location of chemical bonding between the organic chromophore and the aromatic group, and accordingly, a 3-dimensional spatial orientation of the organic chromophore is significantly changed in the EO film.

Therefore, the polymer is manufactured by polymerizing a diacid-diester isomer with one-directionally oriented chromophore in 3-dimensional space separated mainly from three types of isomers in the diacid-diester monomer chemically attached to the organic chromophore, and a diamine.

Here, the dianhydride may be any aromatic dianhydride, and specifically, may be selected from a group containing 4,4'-oxydiphthalic anhydride (ODPA), 4,4'-(hexafluoroisopropylene) diphthalate anhydride, benzophenone tetracarboxylate dianhydride, biphenyl tetracarboxylate dianhydride, and pyromellitic dianhydride, and preferably, 4,4'-oxydiphthalic anhydride (ODPA).

The organic chromophore includes a π-conjugated organic molecule having both an electron-donating group and an electron-releasing group, but not limited thereto. Preferably, the organic chromophore may include 2-{ethyl-[4-(4-nitrophenylazo)-phenyl]-amino}-ethanol (DR1) represented by Formula 3, 2-{[4-(2-chloro-4-nitro-phenylazo)-phenyl]-ethyl-amino)-ethanol (DR13) represented by Formula 4, 2-(methyl-{4-[2-(4-nitro-phenyl)-vinyl]-phenyl}-amino)-ethanol represented by Formula 5, and 2-cyano-3-{4-(2-hydroxy-ethyl)-methyl-amino]-phenyl}-but-2-endinitrile represented by Formula 6.

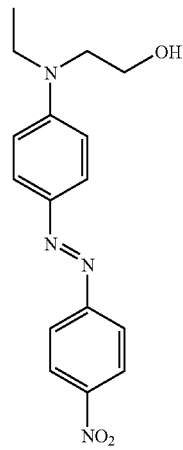

[Formula 3]

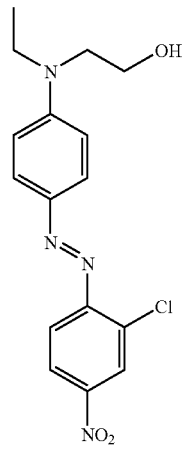

[Formula 4]

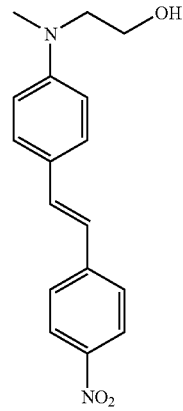

[Formula 5]

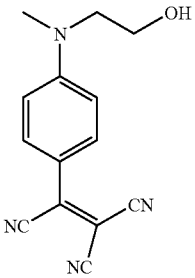

[Formula 6]

In addition, the diamine may be any aliphatic or aromatic group, but may be selected from a group containing 2,2-bis (4-aminophenyl) hexafluoropropane, 4,4'-diaminooctafluorobiphenyl, oxydianiline, p-penylene diamine, and 1,3-diaminopropane, and more preferably 2,2-bis(4-aminophenyl) hexafluoropropane.

In addition, when the polymer according to the present invention is a copolymer, an arrangement between different species of monomers may be any arrangement. For example, those are a random copolymer, alternating copolymer, block copolymer, graft copolymer.

The aromatic dianhydride, a monomer of the polymer, according to the present invention may vary in the number of isomers according to the chemical structure of the aromatic dianhydride. For example, when an organic chromophore D having optical nonlinearity is reacted with an aromatic dianhydride, there are two types of isomers as shown in Formula 7:

[Formula 7]

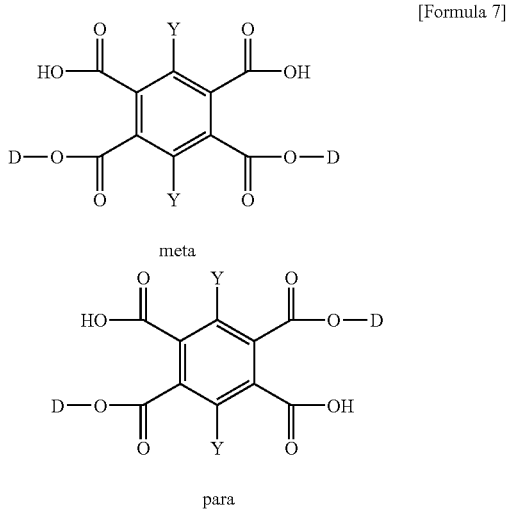

where Y is halide, hydrogen, deuterium, $(CH_2)_nCH_3$ (n is 0 to 10), $(CF_2)_mCF_3$ (m is 0 to 10), phenyl, phenoxy, biphenyl, biphenoxy, phenol fluoride, phenoxy fluoride, biphenyl fluoride, or biphenoxy fluoride.

In addition, when the organic chromophore D having optical nonlinearity is reacted with a bridged aromatic dianhydrides, there are three types of isomers as shown in Formula 8:

[Formula 8]

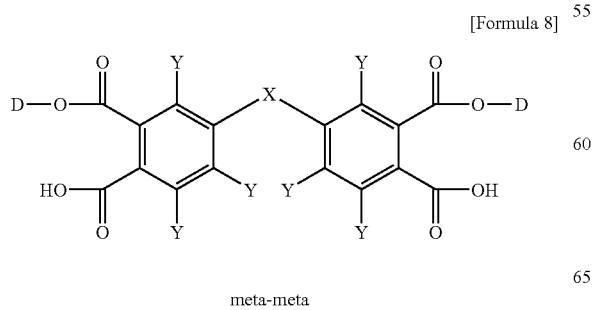

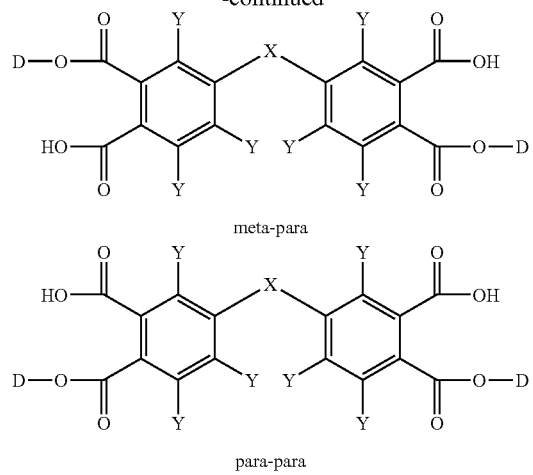

where, X is O, C=O, $C(CF_3)_2$,

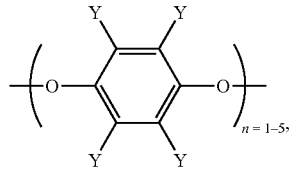

and Y is as defined above.

Besides, there may be other isomers as follows:

[Formula 9]

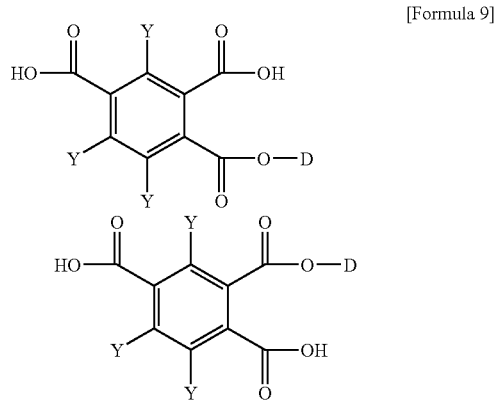

where Y is as defined above.

Specifically, when the organic chromophore D having optical nonlinearity is reacted with a bridged aromatic dianhydride ODPA (X=O), there are three types of isomers as shown in Formula 10:

[Formula 10]

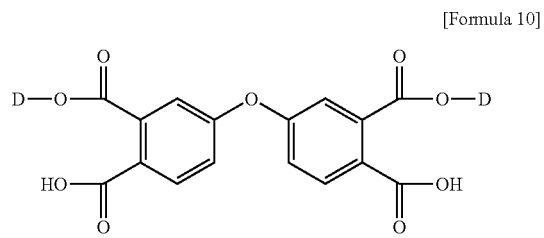

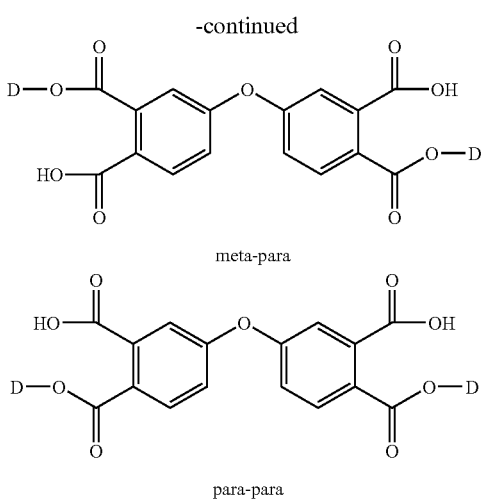

meta-para para-para

Figure 4:
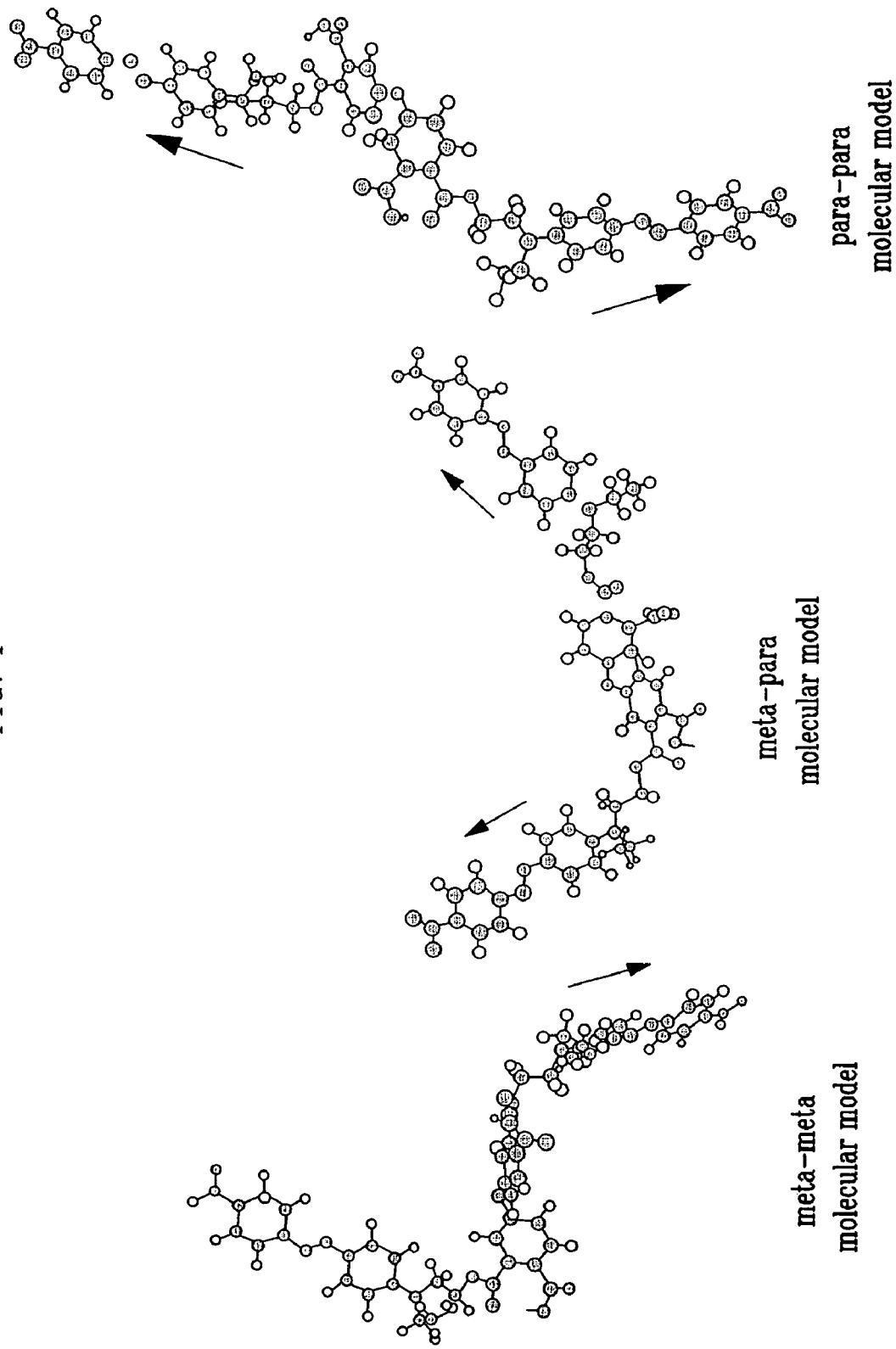
FIG. 4 shows the most stable molecular models structures of the diacid-diester isomers obtained by using MOPAC calculation.

The most stable structure of the diacid-diester isomers obtained by using MOPAC calculation may be represented with the following molecular models depicted in FIG. 4.

Likewise, the organic chromophore has an orientation according to each type of isomer. Among the diacid-diester isomer monomers obtained from the reaction between ODPA and disperse red 1 (DR1), only the meta-para type shows slightly one-directional orientation of the organic chromophore in a 3-dimensional space. The EO polymer prepared from the meta-para type diacid-diester monomer and a diamine may exhibit a poling effect without a poling process.

Figure 5:
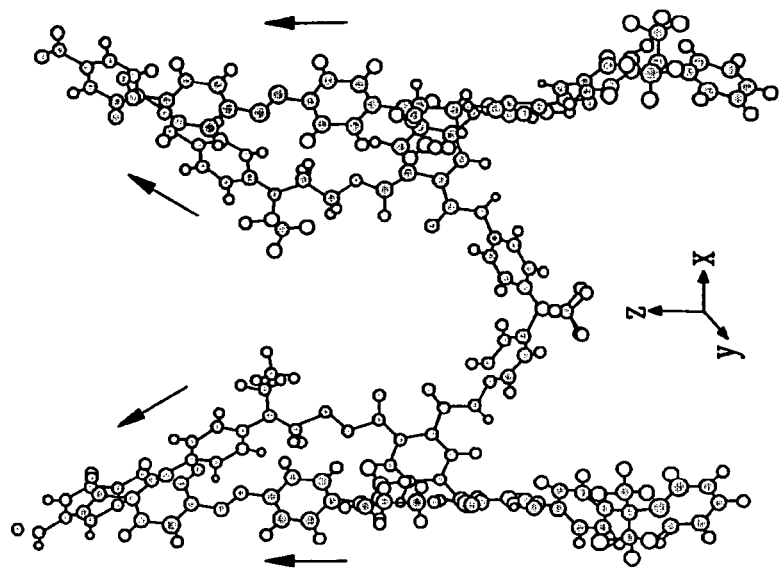
FIG. 5 shows the most stable molecular structure of Formula 11 in a 3-dimensional space obtained from MOPAC calculation by simulating some repeating unit of the polymer that synthesizes from 2,2-bis(4-aminophenyl) hexafluoropropane (6F) and the meta-para type isomer among three types diacid-diester isomers obtained from a reaction of DR1 with ODPA.
Figure 5:
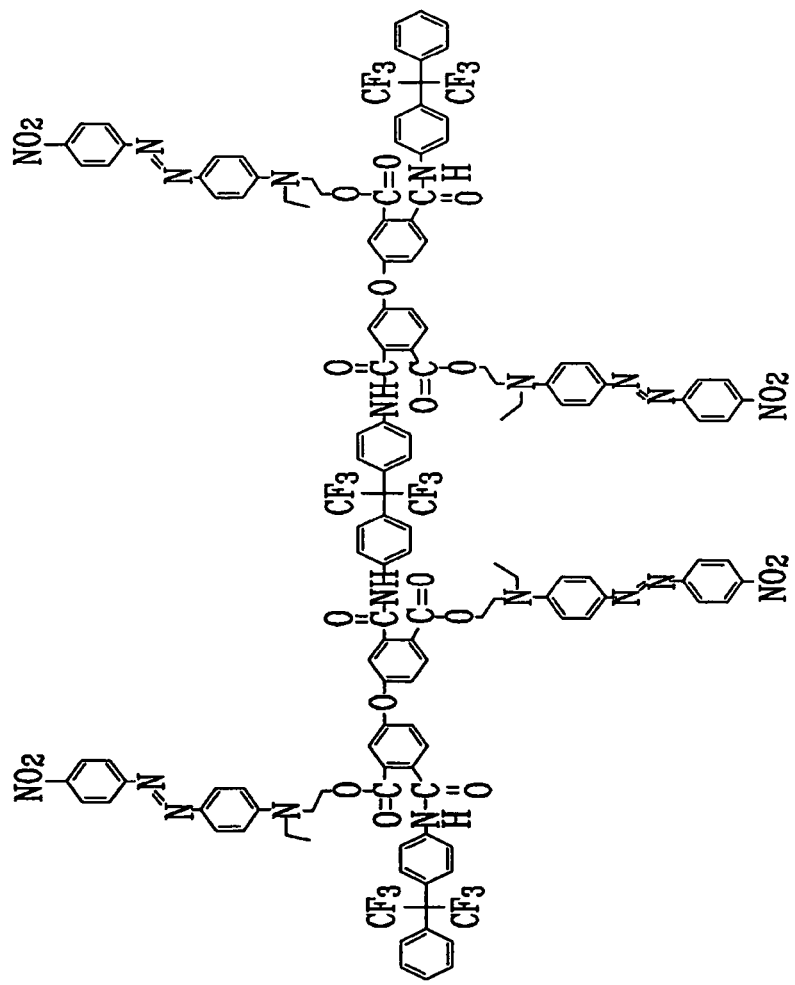

As depicted in FIG. 5, Formula 11 shows the most stable molecular structure in a 3-dimensional space obtained from MOPAC calculation by simulating some repeating unit of the polymer that synthesizes from 2,2-bis(4-aminophenyl) hexafluoropropane (6F) and the meta-para type isomer among three types diacid-diester isomers obtained from a reaction of DR1 with ODPA.

The isomers with one-directionally oriented chromophore in 3-dimensional space may be 45 to 100 mol % of the diacid-diester isomer mixture. It is not desirable that the isomers with one-directionally oriented chromophore in 3-dimensional space is less than 45 mol % of the diacid-diester isomer mixture, since the EO effect naturally obtained from the specific configuration of chemical structure of the EO film can not be achieved.

According to a second aspect of the present invention, there is provided a method of manufacturing a self-poled EO and NLO polymer, wherein among three types of isomers in a diacid-diester monomer in which an organic chromophore is chemically attached to an aromatic dianhydride. The self-poled EO and NLO polymer is obtained from the reaction between the diacid-diester monomer containing largely isomer with one-directionally oriented chromophore in 3-dimensional space and a diamine. The method comprises the steps of: (i) reacting an aromatic dianhydride with an organic chromophore having optical nonlinearity to synthesize a diacid-diester monomer chemically attached to the organic chromophore; (ii) separating only an isomer with one-directionally oriented chromophore in 3-dimensional space from the diacid-diester isomer mixture; and (iii) polymerizing the separated isomer monomer and a diamine.

In the manufacturing method, (i) Reaction of dianhydride with organic chromophore for synthesizing the diacid-diester monomer chemically attached to the organic chromophore is conducted in a solvent in a mole ratio of the dihydride to the organic chromophore in the range of 1:2.1 to 1:2.2.

Here, the dianhydride may be any aromatic dianhydride, and the organic chromophore may be a π-conjugated organic molecule having both an electron-donating group and an electron-releasing group. A detailed description thereof is given above.

The reaction takes place under conditions known in the art, preferably, at a temperature of 50° C. to 70° C., and in any proper solvent capable of dissolving the reactants, e.g., dimethylformamide (DMF). In addition, the reaction preferably takes place in an inactive atmosphere, e.g., a nitrogen atmosphere, in order to prevent a hydrolysis reaction of the dianhydride moiety.

A diacid-diester monomer chemically attached to the organic chromophore may exist in various isomers. Therefore, (ii) the step of separating isomer with one-directionally oriented chromophore in 3-dimensional space from the diacid-diester isomer mixture is performed.

The separation may be accomplished using a method well known in the art, and preferably, through an extraction method. Here, it is preferable that at least 45 mol % of the isomers with one-directionally oriented chromophore in 3-dimensional space is obtained from a separation of the diacid-diester isomer mixture.

Next, (iii) the step of polymerizing the isomers with one-directionally oriented chromophore in 3-dimensional space and the diamine is performed.

A solution polymerization method is used for polymerizing the diacid-diester isomer and the diamine.

The above-mentioned monomers may be use as a diacid-diester diamine, and the diacid-diester and the diamine preferably react in a mole ratio of 1.0 to 1.05.

The polymerization is conducted in polar aprotic solvents such as dimethylacetamide (DMAc), dimethylformamide (DMF), and methylpyrrolidone (NMP). Among these, DMAc and NMP are particularly suitable. An appropriate temperature for the polymerization reaction is in the range of 0 to 50° C., and preferably in the range of 5° C. to room temperature. Preferably, the polymerization reaction takes place in an inactive atmosphere, e.g., in a nitrogen atmosphere, in order to prevent a hydrolysis reaction of the dianhydride moiety. To facilitate the polymerization, pyridine and phenyl phosphonate dichloride are used as catalysts.

The obtained polymer may be purified using an appropriate method known in the field of organic chemistry. For example, the polymer solution is dropwise added to a nonsolvent for precipitation, and if needed, the process may be repeated. Further, two or more purification methods can be used.

According to a third aspect of the present invention, there is provided a film manufactured from a self-poled EO and NLO polymer, wherein among three types of isomers in a diacid-diester monomer in which an organic chromophore is chemically attached to an aromatic dianhydride. The self-poled EO and NLO polymer is obtained from the reaction between the diacid-diester monomer containing largely isomer with one-directionally oriented chromophore in 3-dimensional space and a diamine. The EO and NLO properties of the film are achieved without a typical poling process in which an electrical field is applied around Tg of the polymer.

The film is manufactured by spin coating and drying the polymer solution. Since spin coating method is used, a relatively thick film can be easily obtained compared with an LB or layer-by-layer self-assembled film.

The EO polymer solvents do not change the properties of polymer and do not react on the polymer during dissolving the polymer. The proper solvent may be cyclopropane, cyclohexanone, or γ-butyrolactone. The polymer solution concentration may be 10 to 20 wt %, and preferably, about 15 wt %.

Embodiments of the present invention will now be described in more detail in order to enable those skilled in the art to gain a full understanding of the present invention. Let it be clear that a variety of modifications can be made to the embodiments described below without departing from the spirit and scope of the present invention.

Embodiment 1

Index

Dianhydride: Oxydiphthalic anhydride (ODPA)
Organic Chromophore Disperse Red 1 (DR1)
Diamine: 2,2-bis(4-aminophenyl) hexafluoropropane (6F)
Diacid-diester monomer obtained by reacting an organic chromophore with ODPA (ODPE)
First Step: ODPE Synthesis 2.0 g of ODPA and 4.5 g of DR1 were dissolved in 35 ml of anhydrous dimethylformamide in a 100 ml 2-hole flask, under a nitrogen atmosphere, at the room temperature, and the temperature was increased up to 60° C. while stirring the solution for 24 hours. After reaction, the reaction solution was cooled down to room temperature, and precipitated in distilled water. Red precipitates were filtered and cleansed again in distilled water and dried in a vacuum at 60° C. to obtain ODPE in which three types of isomers are mixed.

Second Step: Separation of Meta-Para Type ODPE

To separate meta-para type isomers from ODPE isomer mixture, other two type isomers were extracted from butylacetate for 24 hours using a Soxhlet apparatus. ODPE remaining in a thimble was recrystallized from butylacetate at low temperature and the obtained precipitate was removed. Butylacetate was removed from the remaining solution under vacuum at room temperature to obtain meta-para isomer-rich ODPE (meta-meta: about 7%, meta-para: 72%, and para-para: 20%).

Third Step: Manufacturing EO and NLO Polymer

After 1.0261 g of meta-para isomer-rich ODPE was dissolved in purified 1-methyl-2-pyrrolidinone under a nitrogen atmosphere, at room temperature, 0.43 g of phenyl phosphonic dichloride and 0.36 ml of pyridine were added to the solution. 0.3653 g of 6F was added to the solution. A polymerization reaction was carried out for 24 hours. A viscous polymer solution was precipitated into methanol to obtain red-colored powder, and the unreacted monomers and additives were extracted from methanol using a Soxhlet extractor for 24 h. The red EO and NLO polymer powder was dried under vacuum at 60° C. (yield: 71%). The resulting polymer was analyzed using 1H-NMR and the result was shown in FIG. 1. As illustrated in FIG. 1, the EO polymer is prepared well.

Figure 6:
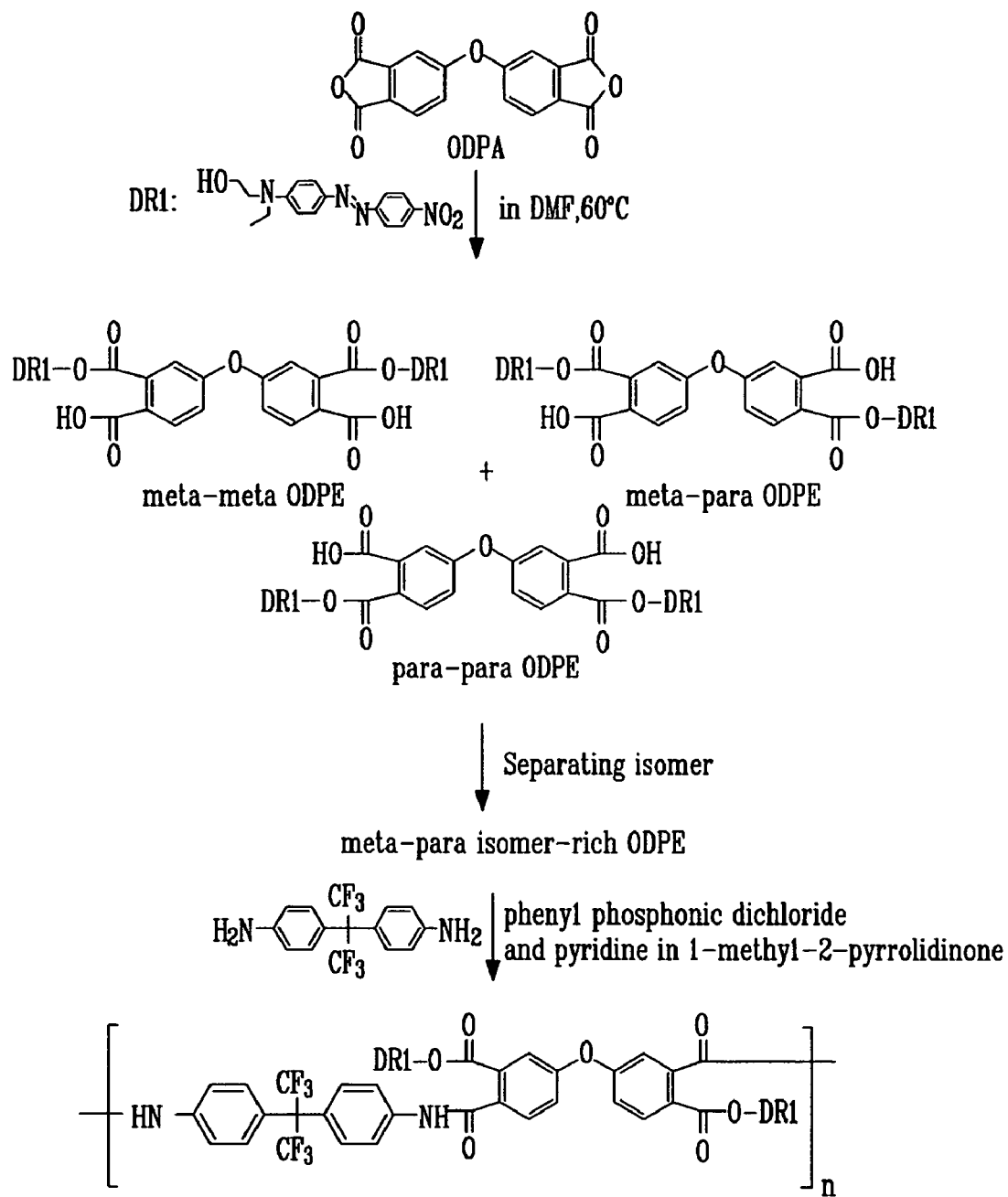
FIG. 6 shows reaction and synthesis for preparing the EO and NLO polymer of the first embodiment.

Reaction and synthesis for preparing the EO and NLO polymer of the first embodiment are shown in FIG. 6.

Embodiment 2

Manufacturing Side Chain Type EO and NLO Polymer Film

After 0.4 g of polymer powder of Embodiment 1 was completely dissolved in 1.7Ml of cyclopentanone, the solution was filtered with a 0.2-μm Teflon filter to remove all fine particles. The polymer concentration was adjusted to 15 wt %. The solution was spin-coated on an indium tin oxide (ITO) glass at 800 rpm for 30 sec. The film was dried at 80° C. under vacuum for 2 days. A gold electrode (thickness: 0.1 μm) was prepared on top of the polymer film on the ITO glass by thermal vacuum evaporation.

Test Example 1

Measurement of EO Coefficient

An EO coefficient ($r_{33}$) of the film obtained from Embodiment 2 was measured at a wavelength of 1.55 μm using a simple reflection method suggested by Teng et al. (C. C. Teng. H. T. Man, Appl. Phys. Lett., 56, 1734, 1990). In addition, $r_{33}$ was measured while exposing the film at 80° C. for 250 hours. The results are shown in FIG. 2.

Figure 2:
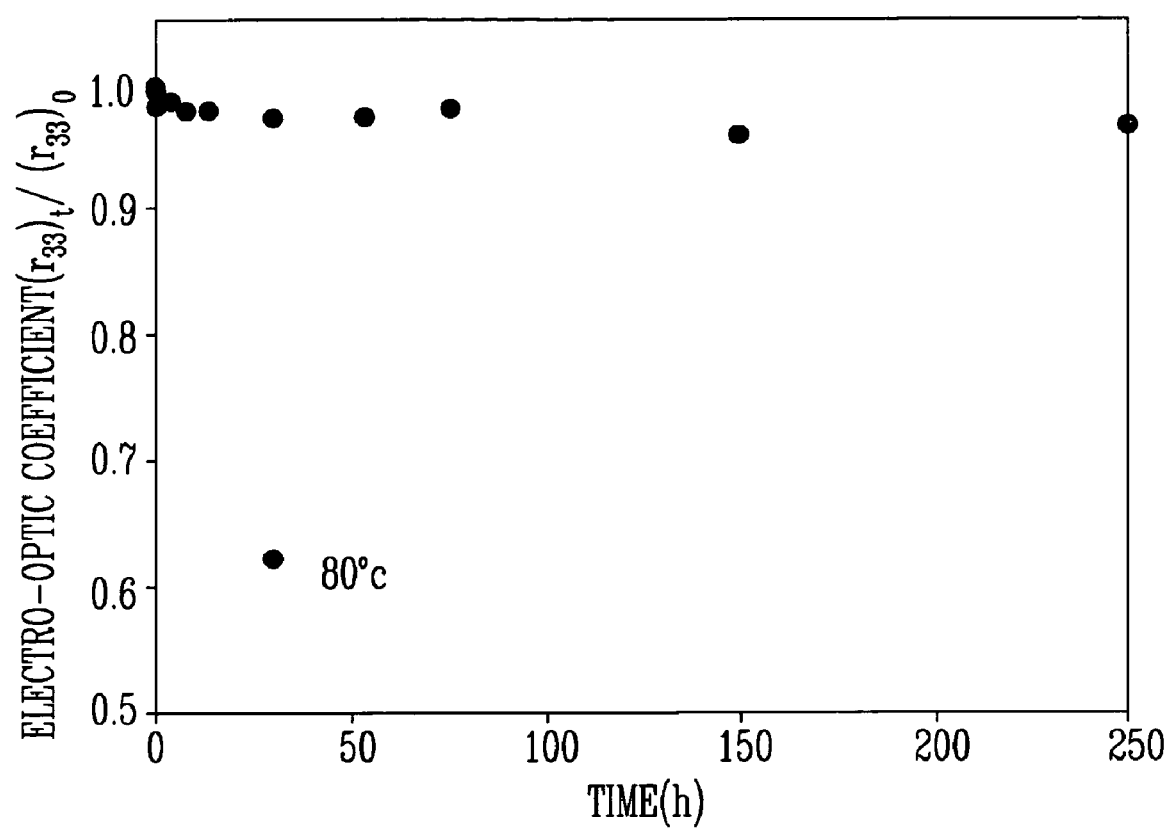
FIG. 2 shows the thermal stability of EO effect of a film manufactured according to a second embodiment of the present invention. The EO coefficient obtained over time for the film stored at a high temperature is normalized to the initial EO coefficient.
Figure 3:
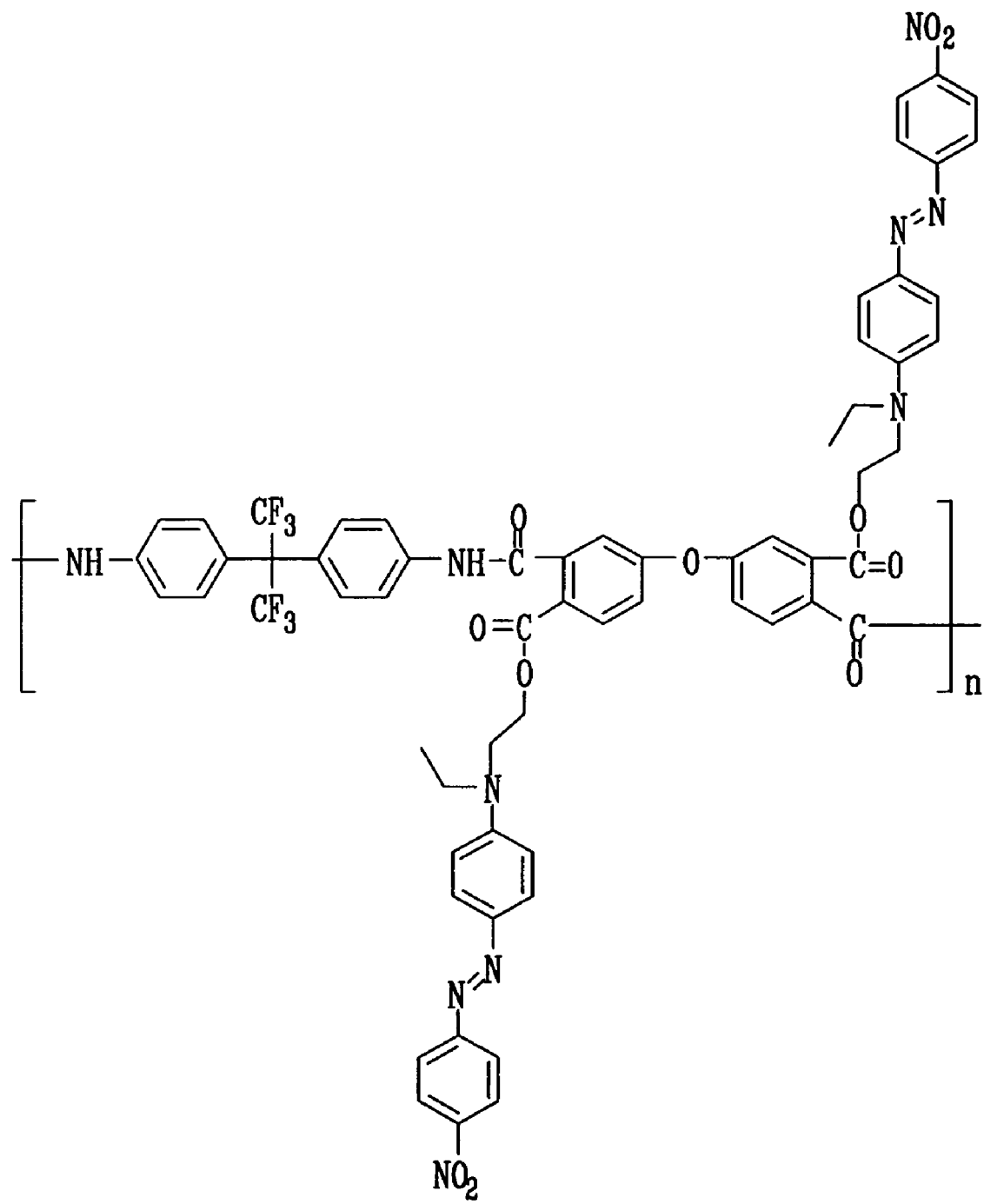
FIG. 3 shows an example of a polymer according to the present invention is illustrated as Formula 2 where n is 5 to 500.

The film of Embodiment 2 had an EO coefficient of about 6.0 pm/V without a poling process, and further, as can be seen in FIG. 2, the EO coefficient of the film of Embodiment 2 was maintained at more than 95% even when the film exposed for 250 hours at 80° C., showing excellent thermal stability.

In the EO and NLO polymer according to the present invention, the nano-structure of the polymer is controlled to have a organic chromophore one-dimensional oriented in a 3-dimensional space.

When a film is made from a polymer with one-directionally oriented chromophore in 3-dimensional space using spin coating, the film becomes an EO and NLO polymer film without a poling process.

The most important effect of the present invention is that since the poling process is not required, a manufacturing process of an optical device chip can be simplified. In addition, omission of the poling process may remove several restraints in manufacturing a polymer optical device. In practical optical waveguide devices, the EO polymer is sandwiched between two cladding layers. During poling, DC voltage is applied and is divided among the three layers according to their resistivity. Therefore, the resistivity of the cladding layers is similar to or lower than that of the core layer for maximizing the poling effect. That is the most important consideration in developing a cladding material. Thus, when the optical waveguide is already poled without a poling process, the importance of cladding development is significantly reduced.

Since alignment of the chromophore obtained from an external electric field is thermodynamically instable, the stability of alignment of the chromophore in the EO film is low at high temperature. In contrast, the stability is excellent when the organic chromophore is naturally aligned in the film, as in the present invention.

When the poled state of the polymer film is naturally formed as in the present invention, relaxation dependency of the orientation of the organic chromophore on temperature is lower than that in the typical EO and NLO film obtained through the poling process.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A self-poled electro-optic and nonlinear optical polymer represented by Formula I, wherein among three types of isomers in a diacid-diester monomer in which an organic chromophore is chemically attached to an aromatic dianhydride, the self-poled electro-optic and nonlinear optical polymer is prepared from a diacid-diester monomer containing largely isomer with one-directionally oriented chromophore in 3-dimensional space and a diamine

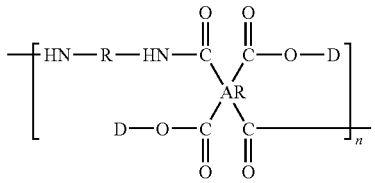

where, AR is an aromatic group, R is an aliphatic or aromatic group, D is a residue of an organic chromophore molecule having electro-optic and nonlinear optical properties, and n is 5 to 500.

2. The self-poled electro-optic and nonlinear optical polymer according to claim 1, wherein a mole ratio of the isomer with one-directionally oriented chromophore in 3-dimensional space to the diacid-diester isomer mixture is 0.45 to 1.

3. The self-poled electro-optic and nonlinear optical polymer according to claim 1, wherein the organic chromophore is a π-conjugated organic molecule having both an electron-donating group and an electron-releasing group.

4. The self-poled electro-optic and nonlinear optical polymer according to claim 1, wherein the organic chromophore is one selected from a group consisting of 2-{ethyl-[4-(4-nitro-phenylazo)-phenyl]-amino}-ethanol (DR1), 2-{[4-(2-chloro-4-nitro-phenylazo)-phenyl]-ethyl-amino)-ethanol (DR13), 2-(methyl-{4-[2-(4-nitro-phenyl)-vinyl]-phenyl}-amino)-ethanol, and 2-cyano-3-{4-(2-hydroxy-ethyl)-methyl-amino]-phenyl}-but-2-endinitrile.

5. The self-poled electro-optic and nonlinear optical polymer according to claim 1, wherein the polymer is represented by Formula II:

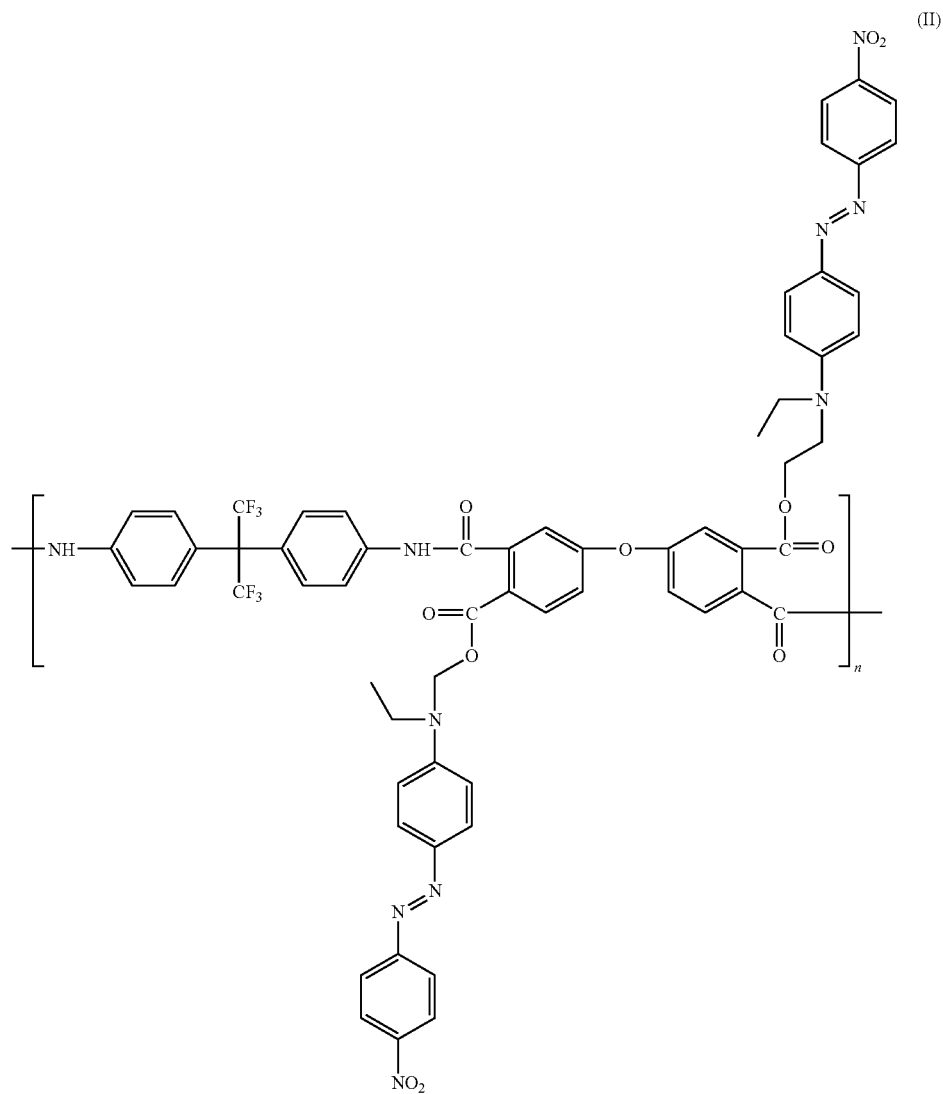

where n is 5 to 500.

6. A method of manufacturing a self-poled electro-optic and nonlinear optical polymer represented by Formula I according to claim 1, the method comprising the steps of:
   reacting an aromatic dianhydride with an organic chromophore having optical nonlinearity to synthesize a diacid-diester monomer attached to the organic chromophore;
   separating only an isomer with one-directionally oriented chromophore in 3-dimensional space from the diacid-diester monomer isomer complex attached to the organic chromophore; and
   polymerizing the separated monomer with a diamine.

7. The method according to claim 6,
   wherein the dianhydride is an aromatic one,
   wherein the organic chromophore is a π-conjugated organic molecule having both an electron-donating group and an electron-releasing group, and
   wherein the dianhydride and the organic chromophore react in a mole ratio of 1:2.1 to 1:2.2.

8. The method according to claim 6, wherein the diacid-diester isomer with one-directionally oriented chromophore in 3-dimensional space is separated through a extraction method.

9. The method according to claim 6, wherein the diacid-diester monomer and the diamine are polymerized at a low temperature using polymerization catalysts including phenylphosphonic dichloride and pyridine.

10. A film manufactured from a self-poled electro-optic and nonlinear optical polymer represented by Formula I according to claim 1, wherein among three types of isomers in a diacid-diester monomer in which an organic chromophore is chemically attached to an aromatic dianhydride, the self-poled electro-optic and nonlinear optical polymer is synthesized from a diacid-diester monomer with one-directionally oriented chromophore in 3-dimensional space and a diamine.

* * * * *